United States Patent
Allison et al.

(10) Patent No.: US 11,192,395 B2
(45) Date of Patent: Dec. 7, 2021

(54) COLOR DEVELOPMENT WRITING COMPOSITIONS AND WRITING INSTRUMENTS

(71) Applicant: Crayola LLC, Easton, PA (US)

(72) Inventors: Keith J. Allison, Blandon, PA (US); Victor Hugo Bedoya, Easton, PA (US)

(73) Assignee: Crayola LLC, Easton, PA (US)

( * ) Notice: Subject to any disclaimer, the term of this patent is extended or adjusted under 35 U.S.C. 154(b) by 389 days.

(21) Appl. No.: 15/976,181

(22) Filed: May 10, 2018

(65) Prior Publication Data

US 2019/0077175 A1 Mar. 14, 2019

Related U.S. Application Data

(60) Provisional application No. 62/555,922, filed on Sep. 8, 2017.

(51) Int. Cl.

| | | |
|---|---|---|
| B41M 3/00 | (2006.01) | |
| C09D 191/06 | (2006.01) | |
| C09D 5/00 | (2006.01) | |
| B43K 19/00 | (2006.01) | |
| C09D 7/61 | (2018.01) | |
| C09D 7/48 | (2018.01) | |
| C09D 7/63 | (2018.01) | |
| C08K 3/22 | (2006.01) | |
| C08K 5/17 | (2006.01) | |
| C08L 91/06 | (2006.01) | |
| C09D 13/00 | (2006.01) | |
| C08K 5/00 | (2006.01) | |
| C08K 3/26 | (2006.01) | |

(52) U.S. Cl.
CPC ............ *B41M 3/001* (2013.01); *B43K 19/00* (2013.01); *C08K 3/22* (2013.01); *C08K 5/17* (2013.01); *C08L 91/06* (2013.01); *C09D 5/00* (2013.01); *C09D 7/48* (2018.01); *C09D 7/61* (2018.01); *C09D 7/63* (2018.01); *C09D 13/00* (2013.01); *C09D 191/06* (2013.01); *C08K 3/26* (2013.01); *C08K 5/0041* (2013.01); *C08K 2003/2241* (2013.01); *C08K 2003/265* (2013.01)

(58) Field of Classification Search
CPC ........ B41M 3/001; C09D 191/06; C09D 5/00; C09D 7/61; C09D 7/48; C09D 7/63; C09D 13/00; B43K 19/00; C08K 3/22; C08K 5/17; C08K 5/0041; C08K 3/26; C08K 2003/2241; C08K 2003/265; C08L 91/06

See application file for complete search history.

(56) References Cited

U.S. PATENT DOCUMENTS

| | | | | |
|---|---|---|---|---|
| 4,172,122 A | * | 10/1979 | Kubik | A61K 8/8152 424/59 |
| 4,774,275 A | * | 9/1988 | Hisano | A61L 31/143 524/370 |
| 5,609,896 A | * | 3/1997 | Cox | A23L 7/101 426/102 |
| 6,124,377 A | | 9/2000 | Kaiser et al. | |
| 8,420,568 B2 | | 4/2013 | Kodama et al. | |
| 8,822,374 B2 | | 9/2014 | Stovold et al. | |
| 9,464,185 B2 | | 10/2016 | Pineiro et al. | |
| 2004/0197500 A9 | * | 10/2004 | Swoboda | B65D 65/42 428/34.2 |
| 2005/0084790 A1 | | 4/2005 | Schroeder et al. | |
| 2011/0301290 A1 | * | 12/2011 | Kato | C08G 69/26 524/606 |
| 2013/0231242 A1 | | 9/2013 | Clayton et al. | |
| 2015/0376433 A1 | * | 12/2015 | Tozuka | C09D 13/00 15/427 |
| 2016/0303275 A1 | * | 10/2016 | Joseph | A61F 13/42 |

FOREIGN PATENT DOCUMENTS

| | | |
|---|---|---|
| CN | 105368158 A | 3/2016 |
| GB | 2564572 A | 1/2019 |
| JP | 2007332249 A | 12/2007 |
| JP | 2014051536 A | 3/2014 |
| JP | 2014051537 A | 3/2014 |
| WO | 2012115121 A1 | 8/2012 |

OTHER PUBLICATIONS

Great Britain Combined Search and Examination Report for Application No. GB1813440.3, dated Nov. 29, 2018, 4 pages.
Great Britain Examination Report for GB Application No. 1813440.3, dated May 27, 2021, 3 pages.
Great Britain Examination Report for GB Application No. 1813440.3, dated Jul. 10, 2020, 2 pages.
Great Britain Examination Report for GB Application No. 1813440.3, dated Aug. 24, 2021, 2 pages.

* cited by examiner

*Primary Examiner* — Alexander C Kollias
(74) *Attorney, Agent, or Firm* — RatnerPrestia

(57) ABSTRACT

Writing compositions capable of undergoing a color development when brought into contact with a specific substrate including a color change-inducing compound are provided. Writing instruments comprising such writing compositions are also provided. Application of the writing compositions to surfaces other than the intended substrate will avoid color development and prevent staining of the unintended surfaces. The writing compositions include at least one mineral filler, at least one leuco dye, one or more lipids including one or more waxes, one or more fatty acids, or one or more fatty acid esters or fatty amides, titanium dioxide, and optionally at least one additive.

25 Claims, No Drawings

COLOR DEVELOPMENT WRITING COMPOSITIONS AND WRITING INSTRUMENTS

CROSS REFERENCE TO RELATED APPLICATIONS

This application claims priority to U.S. Provisional Application No. 62/555,922, filed Sep. 8, 2017, which is incorporated by reference herein, in its entirety and for all purposes.

FIELD OF THE INVENTION

The present invention relates generally to writing compositions for use as marking or coloring materials. More specifically, the present invention relates to writing compositions for use with specific marking substrates in systems such that stray marks of color are prevented from appearing on unintended surfaces.

BACKGROUND OF THE INVENTION

Art materials for the entertainment and developmental benefit of children are well-known. For example, drawing and writing materials, such as pencils and crayons, are typically given to children to produce artwork and to stimulate the children's creativity and imagination. To contribute to a pleasant use experience for children, pencils and crayons must be capable of smooth laydown and high intensity or vibrancy of the resulting colored markings. Pencils and crayons must also be sufficiently flexible and resist breakage such that they can be used by children without snapping. With respect to crayons, other beneficial characteristics are the ability to blend and layer various colors to create color composite effects and the ability to vary shades.

Unfortunately, a significant drawback related to typical crayons and colored pencils is that when used by children, they often contribute to messy staining and marking of unintended objects, such as carpets, furniture, walls, or clothing. As a result, adults are often hesitant to provide such crayons and colored pencils to children to avoid potential stains of unintended surfaces.

Thus, there exists a need for writing or marking compositions that prevent formation of stains on surfaces unintended for marking and that develop marks or color only when applied to an intended substrate or surface for marking. Particularly, there exists a need for writing compositions that are substantially non-staining or marking on unintended objects such as carpets, furniture, walls, and clothing, but can generate a varied range of colors when used in conjunction with and applied to an intended substrate.

SUMMARY OF THE INVENTION

An embodiment of the present invention provides writing compositions that impart colored marks to an intended substrate, but avoid staining unintended objects to which they are applied, such as clothing or carpet. The writing compositions comprise at least one mineral filler (e.g., calcium carbonate), at least one leuco dye, one or more lipids including fatty acids, fatty acid esters, and waxes (e.g., paraffin wax, oleic acid, stearic acid, isobutyl stearate, microcrystalline wax), titanium dioxide, and optionally at least one additive (e.g., preservatives, scents, glitter, antioxidants).

The writing compositions are capable of developing vibrant color upon application to or contact with a substrate having a color change-inducing compound. The substrate's color change-inducing compound is capable of initiating a color change in the leuco dye within the writing compositions.

A further embodiment of the present invention provides writing instruments (e.g., crayons) comprising writing compositions according to the present invention.

DETAILED DESCRIPTION OF THE INVENTION

The present invention relates to writing compositions capable of undergoing a color development when brought into contact with a specific substrate having a color change-inducing compound. Suitable substrates are described in U.S. Pat. No. 6,124,377, which is incorporated herein by reference for all purposes. The substrate includes a treated surface having a coating comprising a color change-inducing compound or developer. The substrate is coated in specific locations where color development is desired, while other locations have no coating to prevent color development. The color change-inducing compound interacts chemically with a color precursor/colorant present in the writing compositions (e.g., a leuco dye) to produce a chromophore that results in a visible color forming in or on the substrate.

The color change-inducing compound is preferably acidic, or includes acidic functional groups. For example, if the color precursor/colorant is a leuco dye, the color change-inducing compound may be a Lewis acid. Desirable Lewis acids include, but are not limited to, zinc-containing resins, certain clays, or phenolic resins. The Lewis acid causes a rearrangement of the leuco dye molecule, which results in the development of a chromophore of intense color.

The coating of the substrate may also include one or more binders for retaining the coating components on the substrate. Color formed on the substrate is not easily transferred from the substrate to unintended surfaces. Apart from the specific substrate including a color change-inducing compound, application of the writing compositions to unintended surfaces will resist developing color or will not result in color development or staining of the unintended surfaces.

The coating of the substrate may include a liquid vehicle (e.g., water) into which constituents of the coating are mixed to facilitate application of the coating to the substrate surface. The coating may also include one or more binders (e.g., clay, polymeric binder), a color change-inducing compound (e.g., a phenolic resin), one or more void cell formers (e.g., calcium carbonate), and one or more additives (defoamers, color retardants, surfactants, buffers). An exemplary coating composition is provided in Table 1:

TABLE 1

| Example Coating Mixture | | |
| --- | --- | --- |
| Component | Function | Weight Percentage (wt %) |
| Water | Vehicle | 28.54 |
| Surfynol PC | Defoamer | 0.06 |
| Surfynol 104A | Surfactant | 0.06 |
| ASP NC Kaolin Clay | Clay | 24.29 |
| Calcium Carbonate | Opacifying filler | 1.6 |
| Ansilex 93 Slurry | Clay-TiO2 mixture | 13.18 |
| Ecokote 4361 | Polymeric binder | 11.86 |
| Durez 33446 | Phenolic resin/color developer | 20.41 |
| TOTAL | | 100 |

The writing compositions may be injection molded into different shapes (e.g., pencils, crayons). The writing compositions comprise at least one mineral filler, at least one leuco dye, one or more lipids including fatty acids, fatty acid esters, and waxes, titanium dioxide, and optionally at least one additive.

It has been surprisingly found that the compositions produce resilient writing instruments capable of being used to apply markings to a suitable substrate's surface with minimally protective, supportive sheaths or coverings of rigid material to prevent breakage. The compositions may also be applied to objects and surfaces lacking a suitable color-development substrate without staining or marking the objects or surfaces. The compositions of the present invention include dyes (i.e., leuco dyes) which have minimal or no color prior to coming into contact with a color-change or color-development compound within a suitable substrate. Thus, the compositions of the present invention may be inadvertently applied to an unintended object or surface, for example, by a child, without the dyes leaving a mark. The writing compositions will only develop vibrantly colored markings when brought into contact with an intended substrate including the desired color-development compound. The substrate may be applied to paper.

An embodiment of a writing composition includes at least one suitable mineral filler. The filler may include a mineral carbonate (e.g., calcium carbonate), or suitable micas. The filler may provide stiffness and strength to the writing compositions to resist bending and breaking. The compositions of the present invention may include filler in any suitable amount. Preferably, the filler (e.g., calcium carbonate) is present in an amount between about 3% and 15% by weight of the composition. More preferably, the filler is present in an amount between about 5% and 10% by weight. Even more preferably, the filler is present in an amount between about 6% and 9% by weight.

The compositions also include a colorant (i.e., a leuco dye). The leuco dye may be brought into contact with the specific substrate having a coating including a color change-inducing compound to develop color. The coating may be applied to any location on the substrate where color is desired; the substrate may lack the coating in other locations where color is not desired so as to impede color development in those locations on the substrate. Additionally, the leuco dye does not develop vibrant color when applied to other, unintended surfaces in the absence of the substrate and its coating having the color change-inducing compound. The colorant/dye may have no color or only minimal color in the absence of contact with a color change-inducing compound. The colorant/dye can be present in the writing compositions in any suitable amount. Preferably, the colorant is present from about 0.1% to about 5% by weight of the writing composition. More preferably, the colorant is present from about 0.5% and 3% by weight of the writing composition. Even more preferably, the colorant is present in an amount of between about 1% and 2% by weight of the writing composition.

The writing compositions of the present invention also include at least one lipid including fatty acids, fatty acid esters, fatty amides (e.g., dialkyl stearamides, oleamides), and waxes (e.g., paraffin wax, soy wax, stearic acid, microcrystalline wax). In certain embodiments, the at least one lipid may include a combination of waxes, fatty acids, and fatty acid esters. Waxes may contribute to improved color intensity of the writing compositions after application to a suitable substrate and smooth laydown properties. The at least one lipid may serve to disperse the colorant (e.g., leuco dye) throughout the compositions and to soften the compositions to improve the transfer of compositional constituents, such as the colorant, to the substrate. The at least one lipid is preferably included in an amount between about 75% and 95% by weight of the composition. More preferably, the at least one lipid is included in an amount between about 77% and 93% by weight of the composition. Even more preferably, the at least one lipid is included in an amount between about 80% and 90% by weight of the composition.

The wax or combination of waxes may be present in any suitable amount. The waxes may include paraffin wax, soy wax, and microcrystalline wax (e.g., Multiwax® 180-M). A wax or a combination of waxes is preferably included in an amount between about 30% and about 65% by weight of the composition. More preferably, the wax or combination of waxes is present in an amount between about 40% and 60% by weight of the composition. Even more preferably, the wax or combination of waxes is present in an amount between about 50% and 55%. Preferably, the compositions include combinations of soy wax, microcrystalline wax, and paraffin wax. Preferably, paraffin wax is included in an amount of between about 15% and about 45% by weight of the composition. Preferably, microcrystalline wax is present in an amount between about 5% and about 20% by weight. Preferably, soy wax is present in an amount between about 5% and about 20% by weight.

The fatty acids may be present in any suitable amount. The fatty acids may include oleic acid and/or stearic acid. A fatty acid or combination of fatty acids is preferably included in an amount between 20% and about 50% by weight of the composition. More preferably, the fatty acid or combination of fatty acids is present in an amount between about 25% and 45% by weight of the composition. Even more preferably, the fatty acid or combination of fatty acids is present in an amount between about 30% and 40% by weight of the composition.

In certain embodiments, the compositions include both stearic acid and oleic acid. Preferably, stearic acid is present in an amount of between about 24.5% and about 45% by weight of the composition. Preferably, oleic acid is present in an amount between about 0.5% and about 10% by weight of the composition.

In certain embodiments, fatty acid esters and/or fatty amides may be present in any suitable amount. The fatty acid esters and/or fatty amides may include isobutyl stearate, dialkyl stearamides, and/or oleamides. A fatty acid ester, fatty amide, or any combination thereof is preferably included in an amount between 0.1% and about 5% by weight of the composition. More preferably, the fatty acid ester, fatty amide, or combination thereof is present in an amount between about 0.5% and 3% by weight of the composition. Even more preferably, the fatty acid ester, fatty amide, or combination thereof is present in an amount between about 1% and 2% by weight of the composition.

The writing compositions of the present invention also comprise titanium dioxide. The titanium dioxide masks or disguises premature development of color to prevent development of stains or marks on any surfaces other than that of the substrate. The titanium dioxide may be present in any suitable amount in the compositions. Preferably, the titanium dioxide is present in an amount between about 1% and 10% by weight of the composition. More preferably, the titanium dioxide is present in an amount between about 2% and 7% by weight of the composition. Even more preferably, the titanium dioxide is present in an amount between about 3% and 5% by weight of the composition.

According to certain embodiments, writing compositions of the present invention include optional additives. These additives may include, but are not limited to, scents, glitter, preservatives, thermal stabilizers, and antioxidants. In particular embodiments, the compositions of the present invention comprise between about 0.05% and about 5% by weight additive(s). Other particular embodiments of the compositions comprise between about 0.5% and about 3% by weight additives. Further particular embodiments of the compositions include between about 1% and 2% by weight.

Such additives are readily available from numerous sources. One or more preservatives, such as anti-microbial agents and fungicides, can be added to increase the shelf life of the compositions according to the present invention. Some examples of preservatives include Fungitrol® 940, Kathon® LX, Nuosept® 95, Acticide® LA, and Polyphase® P100. Process aids, such as Hydropalat® 44, can be added to aid in mixing of the components. One or more antioxidants may be added to the compositions to aid the titanium dioxide in masking or impeding premature color development of the colorant. Thermal stabilizers, such as Irganox® B 225, prevent the compositions from developing color under exposure to heat. A scent or fragrance may also be added to the composition.

According to an embodiment, the writing composition comprises, consists essentially of, or consists of: calcium carbonate, leuco dye, titanium dioxide, microcrystalline wax, paraffin wax, stearic acid, isobutyl stearate, and oleic acid. In another embodiment of the present invention, the writing composition comprises, consists essentially of, or consists of: calcium carbonate, microcrystalline wax, paraffin wax, stearic acid, titanium dioxide, thermal stabilizer, isobutyl stearate, oleic acid, and leuco dye.

The compositions produced according to embodiments of the invention set forth herein may also be formed into any shape suitable for a writing instrument, including into crayon shapes by injection molding into crayon stick shapes. The crayons provide users with the ability to layer applications of the writing compositions on the coating of the substrate, allowing for blending of the color-development effect between different leuco dyes. Additionally, the crayon shape provides superior control over the amount of writing composition and colorant deposited on the substrate, which allows a user to vary the shade of the color that develops. Crayons produced from the compositions according to embodiments of the invention herein may be covered or wrapped in supportive sheaths or coatings. The sheaths may be made of paper.

As used herein, a percentage (%) refers to a weight percentage of the composition, unless indicated otherwise. The term "Lbs." as used herein refers to an amount in pounds of all components in the total composition.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

The following examples are provided to describe the invention in greater detail and are intended to illustrate, not limit, the invention.

EXAMPLES

While exemplary compositions are set forth below, alternative compositions will be apparent to those skilled in the art. Such artisans will be able to modify the compositions with an eye toward the desired performance properties and intended use.

Exemplary writing compositions according to certain embodiments of the invention herein are shown in Table 2. The components were added and blended until substantial homogeneity was achieved to result in the writing compositions depicted in Table 2. The order of mixing may be modified as needed. Each composition includes a different leuco dye such that the marks produced by each respective composition when brought into contact with the substrate result in a different color as displayed below.

TABLE 2

Exemplary Writing Compositions

| Component | Yellow (Wt %) | Orange (Wt %) | Red (Wt %) | Blue (Wt %) | Green (Wt %) | Brown (Wt %) | Black (Wt %) | Violet (Wt %) |
|---|---|---|---|---|---|---|---|---|
| Stearic acid | 35.9 | 35.9 | 35.9 | 35.9 | 35.9 | 35.9 | 35.9 | 35.9 |
| Paraffin Wax | 35.9 | 35.9 | 35.9 | 35.9 | 35.9 | 35.9 | 35.9 | 35.9 |
| Isobutyl stearate | 1.4 | 1.4 | 1.4 | 1.4 | 1.4 | 1.4 | 1.4 | 1.4 |
| Oleic Acid | 1.4 | 1.4 | 1.4 | 1.4 | 1.4 | 1.4 | 1.4 | 1.4 |
| Microcrystalline Wax | 12.0 | 12.0 | 12.0 | 12.0 | 12.0 | 12.0 | 12.0 | 12.0 |
| Calcium Carbonate | 7.7 | 7.7 | 7.7 | 7.7 | 7.7 | 7.7 | 7.7 | 7.7 |
| Titanium Dioxide | 4.3 | 4.3 | 4.3 | 4.3 | 4.3 | 4.3 | 4.3 | 4.3 |
| Leuco Dye Yellow | 1.4 | | | | | | | |
| Leuco Dye Orange | | 1.4 | | | | | | |
| Leuco Dye Red | | | 1.4 | | | | | |
| Leuco Dye Blue | | | | 1.4 | | | | |
| Leuco Dye Green | | | | | 1.4 | | | |
| Leuco Dye Brown | | | | | | 1.4 | | |
| Leuco Dye Black | | | | | | | 1.4 | |
| Leuco Dye Violet | | | | | | | | 1.4 |
| TOTAL | 100.0 | 100.0 | 100.0 | 100.0 | 100.0 | 100.0 | 100.0 | 100.0 |

TABLE 3

Further Exemplary Writing Compositions

| Component | Percentage by Weight (wt %) |
| --- | --- |
| Stearic Acid | 32.5 |
| Paraffin Wax | 32.5 |
| Soy Wax | 10 |
| Microcrystalline Wax | 10 |
| Calcium Carbonate | 9 |
| Titanium Dioxide | 4.5 |
| Leuco Dye | 1.5 |
| Total | 100 |

Exemplary writing compositions according to certain embodiments of the invention herein are shown in Table 3. The components were added and blended until substantial homogeneity was achieved to result in the writing compositions depicted in Table 3. The order of mixing may be modified as needed.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A writing composition that develops a color on a substrate having a color-development coating when applied to or contacted with the substrate having a color-development coating, the writing composition comprising:
    at least one mineral filler;
    at least one leuco dye having minimal or no color prior to being applied to or contacted with the substrate having a color-development coating;
    one or more lipids comprising one or more waxes, one or more fatty acids, and one or more fatty acid esters, wherein the one or more fatty acid esters comprise isobutyl stearate in an amount between about 0.1 wt % and about 5 wt %;
    titanium dioxide; and
    optionally at least one additive, wherein when the writing, composition is applied to or contacted with the substrate having a color-development coating, the at least one leuco dye interacts chemically with the color-development coating on the substrate to develop the color on the substrate.

2. The writing composition of claim 1, wherein the at least one mineral filler comprises calcium carbonate.

3. The writing composition of claim 1, wherein the the at least one additive is present and is selected from the group consisting, of thermal stabilizers, preservatives, scents, glitter, and antioxidants.

4. The writing composition of claim 3, wherein the at least one additive comprises a thermal stabilizer.

5. The writing composition of claim 1, wherein the one or more waxes includes at least one of a paraffin wax, a soy wax, or a microcrystalline wax.

6. The writing composition of claim 5, wherein the one or more waxes comprise:
    paraffin wax in an amount between about 15 wt % and about 45 wt %; and
    microcrystalline wax in an amount between about 5 wt % and about 20 wt %.

7. The writing composition of claim 5, wherein the one or more waxes comprise:
    paraffin wax in an amount between about 15 wt % and about 45 wt %;
    soy wax in an amount between about 5 wt % and about 20 wt %;
    and microcrystalline wax in an amount between about 5 wt % and about 20 wt %.

8. The writing composition of claim 7, wherein the one or more fatty acids are present in an amount between about 20 wt % and about 50 wt %.

9. The writing composition of claim 1, wherein the one or more fatty acids comprise:
    stearic acid in an amount between about 24.5 wt % and about 45 wt %; and
    oleic acid in an amount between about 0.5 wt % and about 10 wt %.

10. The writing composition of claim 1, wherein:
    the at least one mineral filler is present in an amount between about 3 wt % and about 15 wt %;
    the at least one leuco dye is present in an amount between about 0.1 wt % to about 5 wt %; and
    the one or more lipids are present in an amount between about 75 wt % and about 95 wt %.

11. The writing composition of claim 10, wherein the at least one additive is present in an amount between about 0.05 wt % and about 5 wt %.

12. The writing composition of claim 11, wherein the at least one additive includes a thermal stabilizer.

13. The writing composition of claim 10, wherein:
    the at least one mineral filler is present in an amount between about 5 wt % and about 10 wt %;
    the at least one leuco dye is present in an amount between about 0.5 wt % and about 3 wt %; and
    the one or more lipids are present in an amount between about 77 wt % and about 93 wt %.

14. The writing composition of claim 10, wherein:
    the at least one mineral filler is present in an amount between about 6 wt % and about 9 wt %;
    the at least one leuco dye is present in an amount between about 1 wt % to about 2 wt %; and
    the one or more lipids are present in an amount between about 80 wt % and about 90 wt %.

15. A writing instrument comprising the writing composition of claim 1.

16. The writing instrument of claim 15, wherein the writing instrument is produced via injection molding.

17. The writing instrument of claim 16, wherein the writing instrument is encased within a sheath or covered in a protective coating layer.

18. The writing instrument of claim 17, wherein the sheath comprises paper.

19. The writing instrument of claim 16, wherein the writing instrument is in a crayon shape.

20. The writing instrument of claim 19, wherein the writing instrument is sheathed in paper.

21. The writing composition of claim 1, wherein the titanium dioxide is present in an amount between about 1 wt % and about 10 wt %.

22. A writing composition for use with an intended substrate having a color-development coating, the writing, composition comprising:
    at least one mineral filler;
    at least one leuco dye;
    one or more lipids comprising one or more waxes, one or more fatty acids, and one or more fatty acid esters, the one or more waxes comprising:

paraffin wax in an amount between about 15 wt % and about 45 wt %;
   soy wax in an amount between about 5 wt % and about 20 wt %; and
   microcrystalline wax in an amount between about 5 wt % and about 20 wt %;
  titanium dioxide; and
  optionally at least one additive, wherein the writing composition is configured to be substantially non-staining or non-marking on unintended objects, but can generate a varied range of colors when used in conjunction with and applied to the intended substrate.

23. The writing composition of claim 22, wherein the one or more fatty acid esters comprise isobutyl stearate present in an amount between about 0.1 wt % and about 5 wt %.

24. The writing composition of claim 22, wherein the titanium dioxide is present in an amount between about 1 wt % and about 10 wt %.

25. A writing instrument comprising, the writing composition of claim 22.

* * * * *